(12) United States Patent
Share et al.

(10) Patent No.: US 7,347,908 B2
(45) Date of Patent: Mar. 25, 2008

(54) LEAKPROOF ZIPPER END CRUSH FOR RECLOSABLE BAG AND RELATED METHOD OF MANUFACTURE

(75) Inventors: Lawrence Share, Skokie, IL (US); David J. Matthews, Gilman, IL (US); Donald L. Crevier, Essex, IL (US)

(73) Assignee: Illinois Tool Works Inc., Glenview, IL (US)

( * ) Notice: Subject to any disclaimer, the term of this patent is extended or adjusted under 35 U.S.C. 154(b) by 580 days.

(21) Appl. No.: 10/895,769

(22) Filed: Jul. 21, 2004

(65) Prior Publication Data

US 2006/0029299 A1    Feb. 9, 2006

(51) Int. Cl.
*B32B 37/00* (2006.01)
(52) U.S. Cl. .................. 156/73.1; 156/269; 156/290
(58) Field of Classification Search ............. 156/66, 156/73.1, 73.3, 250, 269, 290, 308.2, 308.4, 156/580.1, 580.2
See application file for complete search history.

(56) References Cited

U.S. PATENT DOCUMENTS 3,790,992 A    2/1974    Herz

FOREIGN PATENT DOCUMENTS

| EP | 1 407 681 A2 | 4/2004 |
|----|---|---|
| GB | 1399502 | 7/1971 |
| WO | WO 00/76352 A1 | 6/1999 |

*Primary Examiner*—James Sells
(74) *Attorney, Agent, or Firm*—Ostrager Chong Flaherty & Broitman P.C.

(57) ABSTRACT

A reclosable bag that can be hermetically sealed. The bag comprises a pair of zipper strips that are joined in respective zones without substantial deformation of the longitudinal profiled closure elements. These zones of zipper strip joinder assist in providing a leakproof transition from the openable section of the zipper to the corner seals, where the longitudinal profiled closure elements are either substantially deformed (e.g., crushed) or absent. The method of manufacture involves the steps of ultrasonically welding a wide area and then thermally crushing a narrower area overlapping the wide welded area to form leakproof zipper joints. This method can be applied to string (flangeless) zippers as well as flanged zippers.

17 Claims, 6 Drawing Sheets

LEAKPROOF ZIPPER END CRUSH FOR RECLOSABLE BAG AND RELATED METHOD OF MANUFACTURE

BACKGROUND OF THE INVENTION

This invention generally relates to reclosable bags whose interior volume is hermetically sealed when the bag is closed. In particular, the invention relates to, but is not limited to, evacuable reclosable storage containers or other evacuable reclosable containers.

Collapsible, evacuable storage containers typically include a flexible, airtight bag, an opening through which an article is inserted inside the bag, a zipper for closing the opening and hermetically sealing the bag, and a fixture through which excess air is evacuated from the bag. A user places an article into the bag through the opening, seals the opening, and then evacuates the air in the bag through the fixture. With the bag thus evacuated, a compressible article contained therein may be significantly compressed so that it is easier to transport and requires substantially less storage space.

Collapsible, evacuable storage containers are beneficial for reasons in addition to those associated with compression of the stored article. For example, removal of the air from the storage container inhibits the growth of destructive organisms, such as moths, silverfish, and bacteria, which require oxygen to survive and propagate. Moreover, such containers, being impervious to moisture, inhibit the growth of mildew.

Not only large, compressible items such as clothing may be stored in a collapsible, evacuable storage container. For example, it may be desirable to store bulk items made of small particles, such as powders or granulated resins, in an evacuated container. One situation that commonly occurs is that a particular bulk item is shipped in a large, rigid container such as a drum. Bulk items may be moisture sensitive and are sealed against moisture during shipment. But many times a user does not need to use the entire contents of the large container, and so once exposed to air the remaining bulk contents quickly become unusable and are thus wasted.

One collapsible, reusable, evacuable storage container is shown in U.S. Pat. No. 5,480,030. This patent discloses a bag that is reclosable by means of a plastic zipper and that is evacuable via a one-way air valve assembly having a flexible diaphragm that seals against a valve seat. The valve assembly also has vanes positioned to prevent the bag material or bag contents from obstructing air holes or the diaphragm while air is being evacuated through the valve assembly.

In many reclosable bags, the zipper comprises a pair of mutually interlockable zipper strips, each zipper strip having a respective generally constant profile along the interlockable portion of the zipper. The ends of the zipper strips are joined together at the sides of the bag. For example, it is known to fuse the ends of the zipper strips together, at the same time that the bag side seals are formed, by the application of heat and pressure. This "thermal crushing" of the plastic zipper creates a transition between "as is" zipper and crushed zipper that is susceptible to the presence of leaks through which air can enter an evacuated bag.

Another known problem afflicting evacuable storage containers is that consumers can inadvertently open an evacuable storage container too wide, so that the open zippered "mouth" of the bag is subjected to much stress where the zipper strips meet and are joined together. If the storage container is opened too wide (over-opened), the zipper joint (where the zipper strips come together) can be stressed and damaged, leading to leaks when the bag is later closed and evacuated.

There is a continuing need for improvements in the construction of storage containers that need to be hermetically sealed. In particular, there is a need for an improved evacuable storage container wherein leakage is eliminated in the areas where the bag side seals overlap the ends of the zipper. There is also a need for a construction that distributes stresses and loads away from the zipper profiles when the mouth of the bag is over-opened, thereby preventing leaks induced by over-opening.

BRIEF DESCRIPTION OF THE INVENTION

The invention relates to a reclosable bag that can be hermetically sealed. The bag comprises a pair of zipper strips that are joined in respective zones without substantial deformation of the longitudinal profiled closure elements. These zones of zipper strip joinder assist in providing a leakproof transition from the openable section of the zipper to the corner seals, where the longitudinal profiled closure elements are either substantially deformed (e.g., crushed) or absent. The invention is directed to reclosable bags having certain features and to related methods of manufacture.

One aspect of the invention is a method of forming a zipper joint joining first and second zipper strips made of thermoplastic material, wherein the first zipper strip comprises a first base and a first longitudinal closure element projecting from the first base, and the second zipper strip comprises a second base and second and third longitudinal closure elements projecting from the second base, the first longitudinal closure element being profiled to project between and interlock with the profiles of the second and third longitudinal closure elements. The method comprises the following steps: (a) arranging the first and second zipper strips so that the first longitudinal closure element projects between and is interlocked with the second and third longitudinal closure elements; (b) supplying sufficient ultrasonic wave energy into a first volume having a first width to cause the material of the interlocked first and second zipper strips in the volume of first width to fuse together, including at least the first longitudinal closure element being fused to the second and third longitudinal closure elements in the first volume; and (c) applying an amount of pressure in the first volume during step (b), the amount of pressure applied causing relatively little deformation of the first through third longitudinal closure elements.

Another aspect of the invention is a method of manufacture comprising the following steps: (a) joining a base of a first zipper strip to a corresponding band-shaped zone of a first panel made of web material, the first zipper strip comprising a first longitudinal closure element; (b) joining a base of a second zipper strip to a corresponding band-shaped zone of a second panel made of web material, the second zipper strip comprising second and third longitudinal closure elements, the first longitudinal closure element being profiled to project between and interlock with the profiles of the second and third longitudinal closure elements; (c) arranging the first and second zipper strips so that the first longitudinal closure element projects between and is interlocked with the second and third longitudinal closure elements; (d) supplying sufficient ultrasonic wave energy into a first volume having a first width to cause the material of the interlocked first and second zipper strips in the first volume to fuse together, including at least the first longitudinal closure element being fused to the second and third longitudinal closure elements in the first volume; and (e) applying an amount of pressure in the volume of first width during step (d), the amount of pressure applied causing relatively little deformation of the first through third longitudinal closure elements.

A further aspect of the invention is a method of manufacture comprising the following steps: (a) joining a base of a first zipper strip to a corresponding band-shaped zone of a first panel made of web material, the first zipper strip comprising a first longitudinal closure element; (b) joining a base of a second zipper strip to a corresponding band-shaped zone of a second panel made of web material, the second zipper strip comprising second and third longitudinal closure elements, the first longitudinal closure element of the first zipper strip being profiled to project between and interlock with the profiles of the second and third longitudinal closure elements of the second zipper strip; (c) arranging the first and second zipper strips so that the first longitudinal closure element of the first zipper strip projects between and is interlocked with the second and third longitudinal closure elements of the second zipper strip; (d) joining a base of a third zipper strip to a corresponding band-shaped zone of the first panel, the third zipper strip comprising a first longitudinal closure element having the same profile as the first longitudinal closure element of the first zipper strip, and the first and third zipper strips being collinear and separated by a gap having a first width; (e) joining a base of a fourth zipper strip to a corresponding band-shaped zone of the second panel, the fourth zipper strip comprising second and third longitudinal closure elements respectively having the same profiles as the second and third longitudinal closure elements of the second zipper strip, and the second and fourth zipper strips being collinear and separated by the gap of first width; (f) arranging the third and fourth zipper strips so that the first longitudinal closure element of the third zipper strip projects between and is interlocked with the second and third longitudinal closure elements of the fourth zipper strip; (g) supplying sufficient ultrasonic wave energy to cause the material of the interlocked first and second zipper strips in a first volume adjacent one end of the gap to fuse together and to cause the material of the interlocked third and fourth zipper strips in a second volume adjacent the other end of the gap to fuse together, including at least the respective first longitudinal closure elements being fused to the respective second and third longitudinal closure elements in each of the first and second volumes; and (h) applying an amount of pressure in each of the first and second volumes during step (g), the amount of pressure applied causing relatively little deformation of the first through third longitudinal closure elements.

Yet another aspect of the invention is a reclosable bag comprising: a receptacle having an interior volume and a mouth, the receptacle comprising first and second panels; and a flexible zipper comprising first and second zipper strips respectively joined to the first and second panels in the area of the mouth, the first zipper strip comprising a first base and a first longitudinal closure element projecting from the first base, and the second zipper strip comprising a second base and second and third longitudinal closure elements projecting from the second base, the first longitudinal closure element being profiled to project between and interlock with the profiles of the second and third longitudinal closure elements, wherein the first and second zipper strips are joined to each other with substantial deformation of the first through third longitudinal closure elements in first and second zones of joinder that are respectively located at opposite ends of the zipper, and are joined to each other with relatively less deformation of the first through third longitudinal closure elements in third and fourths zones of joinder that are respectively located contiguous with and between the first and second zones of joinder, the first and second zipper strips being not joined together in a section lying between the third and fourth zones of joinder.

A further aspect of the invention is a reclosable bag comprising: a receptacle having an interior volume and a mouth, the receptacle comprising first and second panels; and a flexible zipper comprising first and second zipper strips respectively joined to the first and second panels in the area of the mouth, the zipper having a length less than a width of the first and second side panels, the first zipper strip comprising a first base and a first longitudinal closure element projecting from the first base, and the second zipper strip comprising a second base and second and third longitudinal closure elements projecting from the second base, the first longitudinal closure element being profiled to project between and interlock with the profiles of the second and third longitudinal closure elements, wherein the first and second panels zipper are joined to each other in first and second zones of joinder that are respectively located at opposite ends of the mouth, the zipper extending across a region between and contiguous with the first and second zones of joinder, and the first and second zipper strips being joined to each other with relatively little deformation of the first through third longitudinal closure elements in third and fourths zones of joinder that are respectively located contiguous with the first and second zones of joinder respectively, the first and second zipper strips being not joined together in a section lying between the third and fourth zones of joinder.

Other aspects of the invention are disclosed and claimed below.

BRIEF DESCRIPTION OF THE DRAWINGS

Reference will now be made to the drawings in which similar elements in different drawings bear the same reference numerals.

DETAILED DESCRIPTION OF THE INVENTION

Figure 1:
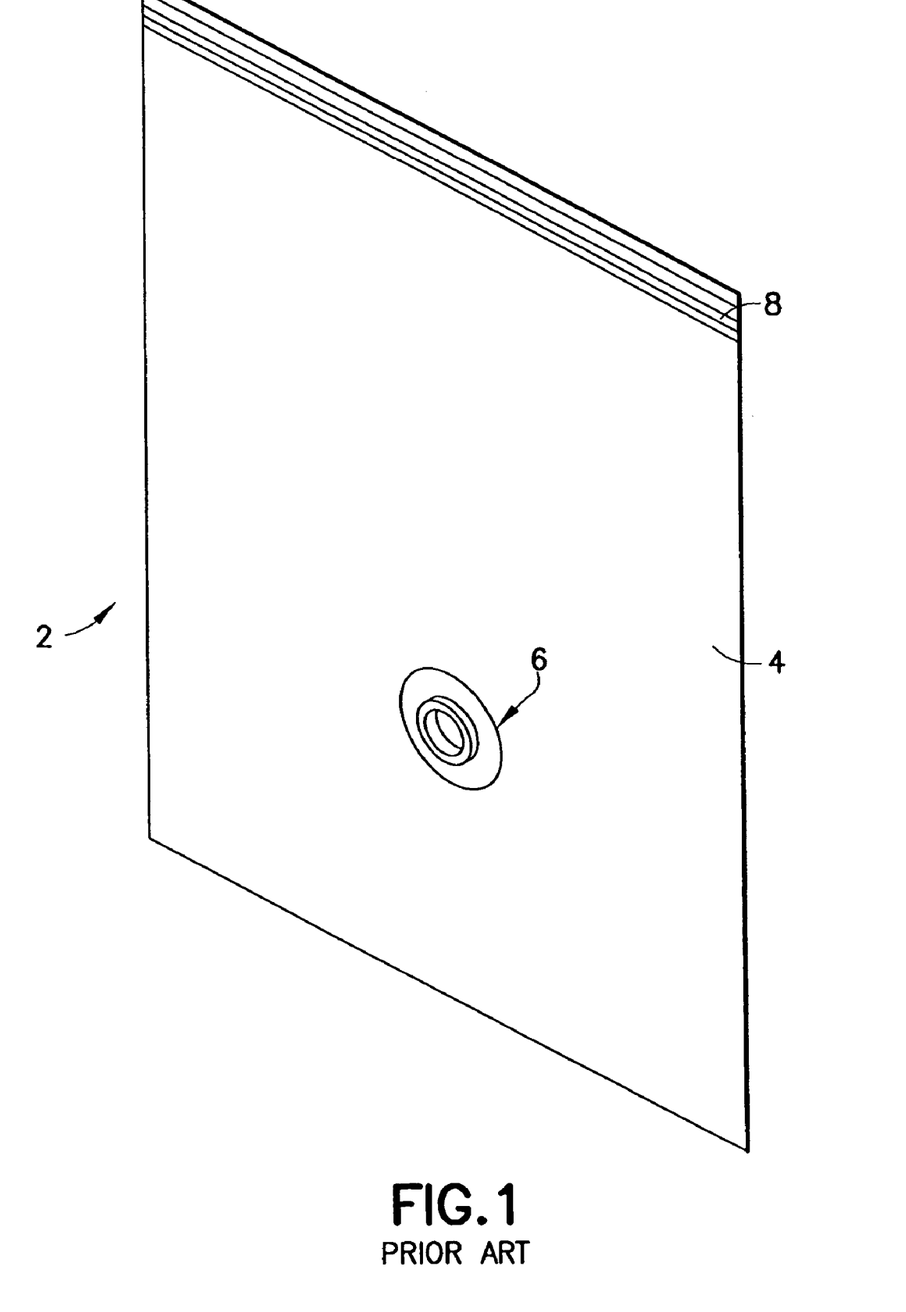
FIG. 1 is a drawing showing an isometric view of one conventional type of collapsible, evacuable storage container.

FIG. 1 shows a conventional collapsible, evacuable storage container 2 comprising a bag 4, a valve assembly 6, and a zipper 8 comprising a pair of mutually interlockable extruded zipper strips that are joined to each other at opposing ends thereof. Although not shown in FIG. 1, the conventional valve assembly 6 also typically comprises a cap that can be snapped onto a portion of the valve assembly that is disposed on the exterior of the bag 4. The cap must be removed before the bag can be evacuated, and then is replaced after the bag has been evacuated. The cap is intended to seal the valve assembly to prevent air from entering the evacuated bag.

The bag 4 typically comprises front and rear walls or panels (made of thermoplastic film material) that are joined together at the bottom and two sides by conduction heat sealing to form a receptacle having an interior volume and a mouth in which the zipper 8 is installed. One wall of bag 4 has a hole (not shown in FIG. 1) in which to install the valve assembly 6. The bag may be constructed of a blended extrusion layer of polyethylene sandwiched between a nylon layer and a layer of polyethylene sheeting. However, the materials comprising the bag may be altered so as to prevent interaction with the bag contents. Alternatively, the bag 4 may be made from a web of film that is folded, the fold forming the bottom of the bag.

During use, one or more discrete articles or a bulk material (not shown) may be placed inside the bag 4 while the zipper 8 is open, i.e., while the closure profiles of the interlockable zipper strips are disengaged from each other. After the article or material to be stored has been placed inside the bag, the mouth of the bag 4 can be sealed by pressing the zipper strips together to cause their respective closure profiles to interlock with each other. Although the zipper closure profiles may have many different designs, the design must be one that ensures that an airtight seal can be formed at the mouth of the bag.

The zipper strips can be pressed together using a device (not shown in FIG. 1) commonly referred to as a "slider" or "clip", which straddles the zipper. The typical slider has a generally U-shaped profile, with respective legs disposed on opposing sides of the zipper. The gap between the slider legs is small enough that the zipper can pass through the slider gap only if the zipper is in a closed state. Thus when the slider is moved along an open zipper, this has the effect of pressing the incoming sections of the zipper strips together. The zipper is opened by pulling apart the zipper upper flanges, as explained in more detail below. The slider can be made using any desired method, such as injection molding. The slider can be molded from any suitable plastic, such as nylon, polypropylene, polystyrene, acetal, polyketone, polybutylene terephthalate, high-density polyethylene, polycarbonate, or ABS.

The zipper 8 is designed to form a hermetic seal at the mouth of the bag 4 when zipper 8 is closed. After the zipper has been closed, the interior volume of the bag can be evacuated by sucking air out via the one-way valve assembly 6. Air can be drawn out of bag 4 through valve assembly 6 using a conventional vacuum source, such as a household or industrial vacuum cleaner. The valve assembly 6 and the zipper 8 maintain the vacuum inside bag 4 after the vacuum source is removed.

The front and rear wall panels of the bag 4 are respectively sealed to the zipper strip by lengthwise conduction heat sealing in conventional manner. Alternatively, the interlockable zipper strips can be attached to the wall panels by adhesive or bonding strips or the zipper profiles can be extruded integrally with the bag material. The walls of the bag may be formed of various types of gas-impermeable thermoplastic material. The preferred gas-impermeable thermoplastics are nylon, polyester, polyvinyl dichloride and ethylene vinyl alcohol. The bag material may be either transparent or opaque.

Figure 2:
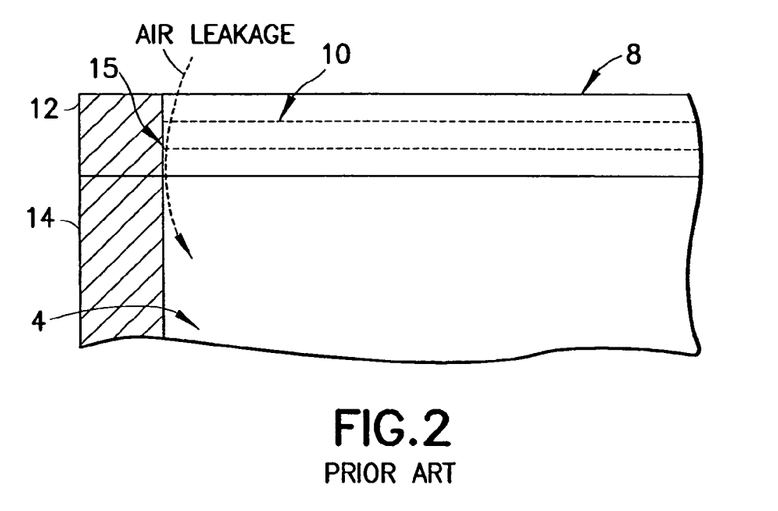
FIG. 2 is a drawing showing a portion of a conventional reclosable storage container having thermal side seals.

In many reclosable bags, the zipper comprises a pair of mutually interlockable zipper strips, each zipper strip having a respective generally constant profile along the interlockable portion of the zipper. The ends of the zipper strips are joined together at the sides of the bag, e.g., by the application of heat and pressure. A representative zipper joint is shown in FIG. 2, which depicts one corner of such a reclosable bag. The dashed lines denote a central portion 10 of the zipper 8, comprising the interlockable profiled closure elements. The ends of the zipper strips are fused together in area 12 at the same time that the bag side seals 14 are formed. This "thermal crushing" of the interlockable profiled closure elements in region 10 of the zipper 8 creates a transition 15 between uncrushed zipper and crushed zipper that is susceptible to the presence of leaks through which air can enter an evacuated bag. Such air leakage is indicated by the dashed arrow in FIG. 2. [For the sake of simplicity, the transition 15 between uncrushed zipper and crushed zipper has been represented as a straight line in FIG. 2. However, a person skilled in the art will recognize that thermoplastic material, when melted or rendered molten, is unlikely to fuse in a manner that forms a perfectly straight line.]

Figure 3:
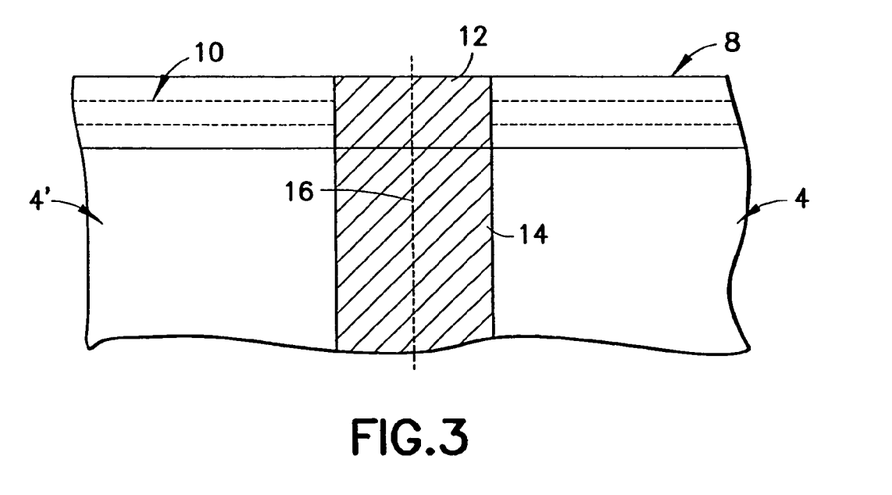
FIG. 3 is a drawing showing a stage in the manufacture of the reclosable storage container depicted in FIG. 2.

During manufacture, the cross seals are made wide enough so that respective halves of the sealed area 14 can be incorporated into two bags, as seen in FIG. 3. The cross-sealed area 14 is bisected by cutting along a line 16 transverse to the zipper 8. The area to the right of the cut line 16 forms the trailing cross seal of the leading bag 4 (assuming advancement of the chain of bags from left to right in FIG. 3), while the area to the left of the cut line 16 forms the leading cross seal of the trailing bag 4'.

The evacuable storage bag may be constructed from two panels of film joined together (e.g., by conduction heat sealing) along three sides of a rectangle. To maintain a vacuum inside the storage bag, the zipper in a closed state must provide a hermetic seal at the mouth (i.e., fourth side) of the bag. Many different types of zippers can be used. The present invention is not directed to any particular zipper construction. For the sake of illustration, however, a suitable zipper for use with the present invention will now be described with reference to FIG. 4.

Figure 4:
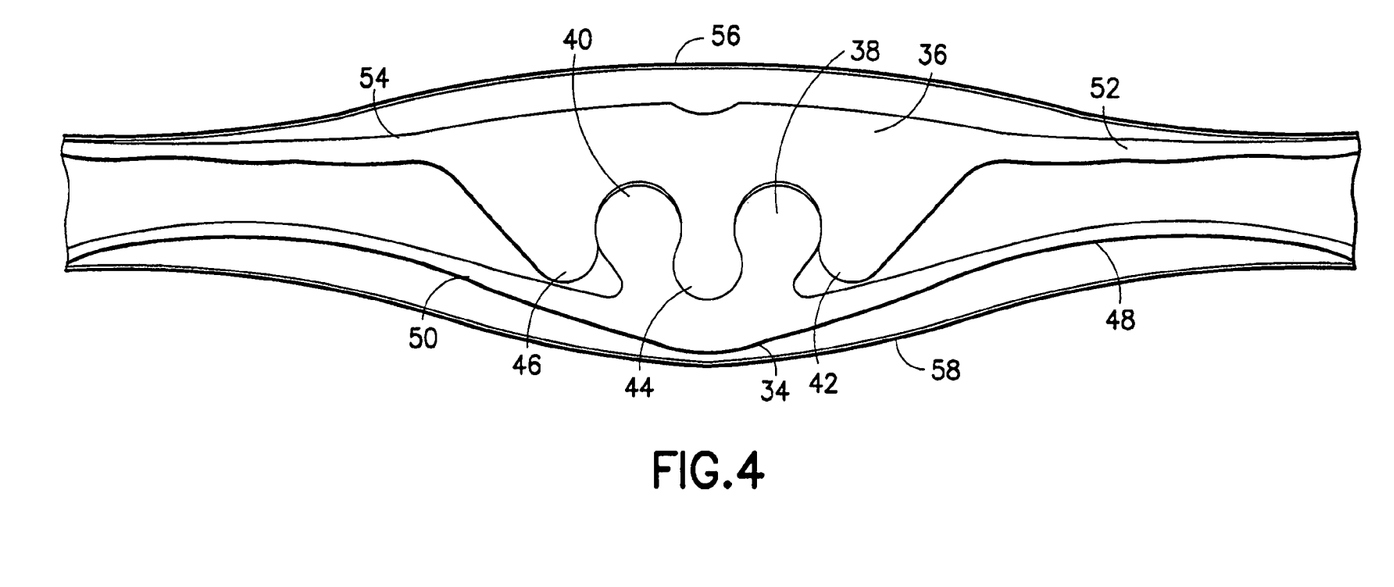
FIG. 4 is a drawing showing a cross-sectional view of a known zipper (undeformed) suitable for use with a bag of the type depicted in FIG. 1.

FIG. 4 shows a conventional zipper 8 that comprises a pair of mutually interlockable extruded zipper strips 34 and 36. The zipper strip 34 comprises a pair of projections 38 and 40 having ball-shaped closure profiles, an upper flange 48, and a lower flange 50. The zipper strip 36 comprises a trio of projections 42, 44 and 46 having ball-shaped closure profiles, a upper flange 52, and a lower flange 54. For each zipper strip, the portions exclusive of the projections will be referred to herein as a "base". The bag walls may be joined to the respective bases of the zipper strips by conduction heat sealing across their entire height or across only portions thereof. For example, the bag walls could be joined to the zipper lower flanges and to the upper flanges by means of conduction heat sealing, as shown in FIG. 4.

Still referring to FIG. 4, the projections 38 and 40 interlock with projections 42, 44 and 46 by fitting inside the respective spaces therebetween. The upper flanges 48 and 52 can be gripped by the user and pulled apart to open the closed zipper. The opened zipper can be reclosed by pressing the zipper strips together (either manually or using a slider) along the entire length of the zipper with sufficient force to cause the projections 38 and 40 to enter the respective spaces between the projections 42, 44 and 46. Alternatively, a slider (not shown) can be used to close the zipper. Typically, such a slider takes the form of a U-shaped clip that fits over the zipper with clearance for the upper flanges, while the legs of the clip cam the zipper profiles of the incoming zipper section into engagement when the slider is moved along the zipper in either direction. The opposing ends of the zipper strips 34 and 36 are typically fused together in the regions of the bag side seals, as previously described.

Welding and sealing of thermoplastic material by ultrasonic vibrations is an established process and has been used for forming slider end stops on the ends of a slider-operated zipper in a reclosable bag and for forming zipper joints generally. A typical ultrasonic welding apparatus in which a workpiece is fed through an ultrasonic weld station comprises an anvil and an oppositely disposed resonant horn. The frontal surface of the horn and the anvil are urged toward mutual engagement, for coupling the ultrasonic vibrations from the activated horn into the thermoplastic material of the workpiece, thereby effecting ultrasonic welding. The horn is energized from a power supply that provides electrical high-frequency power at a predetermined ultrasonic frequency to an electro-acoustic transducer, which, in turn, provides mechanical vibrations at that frequency to a booster or coupling horn for coupling these vibrations to the horn.

Figure 7:
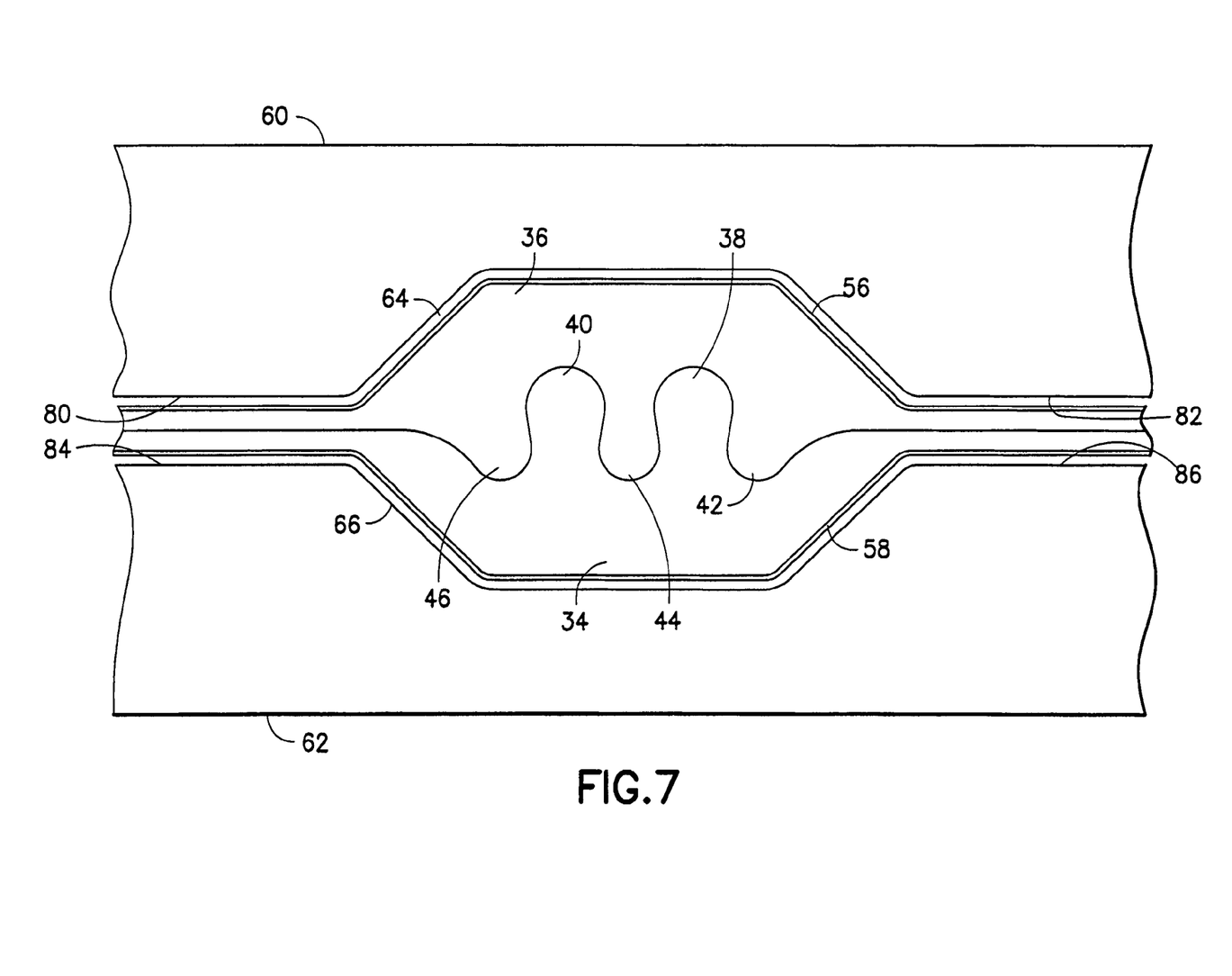
FIG. 7 is a drawing showing a cross-sectional view of a zipper of the type depicted in FIG. 4, in which the zipper halves have been fused together, but without significant deformation.

In accordance with one embodiment of the present invention, air leakage into an evacuated bag at the zipper joints can be eliminated by providing zones of joinder where the profiled interlockable closure elements (e.g., the ball-shaped closure profiles described in FIG. 4) are fused together with little deformation. This is accomplished by ultrasonically welding the zipper strips together in the zones of joinder using a horn 60 and an anvil 62 having the structure shown in FIG. 7. In this case, the horn 60 has a groove or recess 64 disposed between two coplanar flat surfaces 80 and 82, while the anvil 62 has a groove or recess 66 disposed between two coplanar flat surfaces 84 and 86. During welding, surfaces 80 and 82 of the horn respectively confront surfaces 84 and 86 of the anvil, while groove 64 of the horn confronts groove 66 of the anvil. The groove 66 of the anvil is used to guide the zipper relative to the horn during zipper/film advancement, and also assists groove 64 of the horn to "contain" the central portions of the zipper strips during welding. More specifically, the grooves 64 and 66 are configured to provide clearance for the central portions of the zipper strips, including the profiled interlockable closure elements. The surfaces of the grooves are shaped to contact the central portions of the zipper strips during welding (i.e., when the horn and anvil are brought together) with an amount of pressure that is sufficient to ensure acoustically coupling of the horn to the zipper strips, but not so great as to cause the profiled interlockable closure elements to undergo substantial deformation. The confronting flat surfaces 80 and 84 weld the zipper upper flanges together, while the confronting flat surfaces 82 and 86 weld the zipper lower flanges together. In addition, webs 56 and 58 of bag making film are sealed to the backs of the respective zipper strips 34 and 36 from the top to the bottom of the zipper (or from a point near to the top to a point near to the bottom) during ultrasonic welding.

Figure 6:
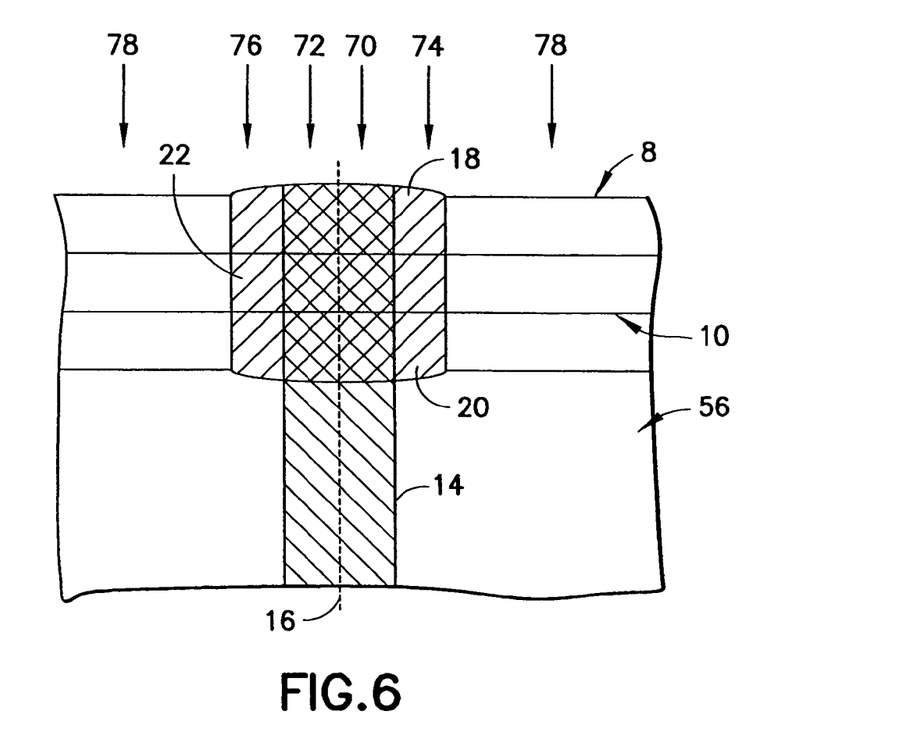

FIG. 6 shows a portion of a zipper sandwiched between and already joined (e.g., by conduction heat sealing) to marginal portions of respective webs of film material, only the front web 56 is indicated in this view. [For the sake of illustration, it is assumed that the film material of web 56 is optically transparent, so that the zipper is visible in FIG. 6.] The hatched area in FIG. 6 represents the zone where the zipper strips are joined (by ultrasonic welding) to each other, and where the respective webs of bag making film are joined to the respective backs of the zipper strips. The upper flanges of the zipper strips are ultrasonically welded together in area 18, the lower flanges of the zipper strips are ultrasonically welded together in area 20, and the profiled interlockable closure elements are ultrasonically welded together (with little or no deformation) in area 22. Welded area 22 includes the material that occupies the aforementioned grooves in the horn and anvil during the welding operation.

After the zone of zipper joinder has been formed by ultrasonically welding areas 18, 20 and 22, the opposing webs of bag making film and the continuous zipper strips joined thereto are advanced one package length or multiple package lengths. At the next work station, the panels are cross sealed by conduction heat sealing. More specifically, sufficient heat and pressure are applied in a strip-shaped zone 14 (see FIG. 6), which extends transverse to the zipper 8, to thermally crush the zipper strips and join the panels together across the full height of the panels. The cross seal 14 overlaps with the zone in which the zipper strips were ultrasonically welded together. As seen in FIG. 6, the width of the cross seal 14 is less than the width of the zone in which the zipper strips have been ultrasonically welded together. Within this zone of overlap (indicated by cross hatching in two directions in FIG. 6) the central region 10 of the zipper 8 is thermally crushed, i.e., flattened. As a result, the profiled interlockable closure elements of each zipper strips undergo substantial deformation.

As seen in FIG. 6, the cross seal 14 at the zipper is inboard of the ultrasonic weld. Preferably a line of symmetry of the ultrasonically welded regions 18, 20, 22 is generally collinear with a centerline of the cross seal 14, which are in turn generally collinear with a line of cutting, indicated by the dashed line 16. However, precise collinearity is not required. When the zipper 8 and bag making film are cut along line 16, the bag on one side of line 16 will be separated from the bag on the other side of line 16, and the cross seal 14 will be divided into respective side seals on the respective bags.

In the final product, each zipper comprises five distinct sections: respective thermally crushed sections 70, 72 at the ends of the zipper, in which the zipper strips are fused together and the interlocked profiled closure elements are substantially deformed; respective ultrasonically welded sections 74, 76 contiguous with the thermally crushed sections 70, 72, in which the zipper strips are fused together and the interlocked profiled closure elements are not substantially deformed; and the remaining section 78 of the zipper (having one end contiguous with one ultrasonically welded section and another end contiguous with the other ultrasonically welded section) in which the zipper strips are interlockable and disengageable (i.e., the profiled closure elements are not fused together). The transition from undeformed ("as is") zipper to each ultrasonically welded region of zipper is very smooth, eliminating or at least reducing leaks.

The foregoing construction could be used on many other zipper end stomps (at the bag's cross seal) where leakage is a problem, by not deforming the zipper and, at the same time, sealing off the bag making film to the zipper flanges and sealing the flanges together. Furthermore, the concept of ultrasonically welding a wide area and then thermally crushing a narrower area overlapping the wide welded area to form leakproof zipper joints can be applied to string (flangeless) zippers as well as flanged zippers.

Figure 5:
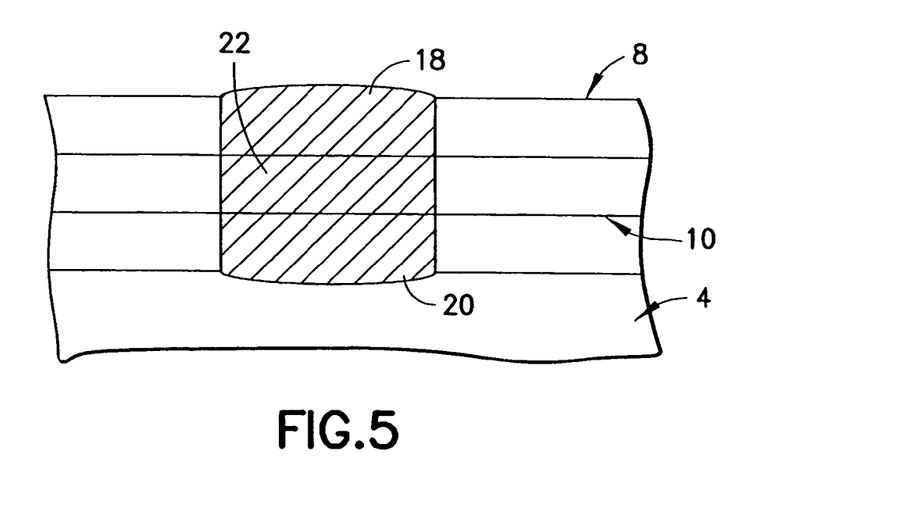
FIGS. 5 and 6 are drawings showing respective stages in a method of manufacture in accordance with one embodiment of the invention.

Reclosable bags of the type described herein can be manufactured on an automated production line. In accordance with one automated method of manufacture, two webs of film are paid off respective rolls and brought into overlying relationship. Downstream respective sets of pull rollers are provided for pulling the webs through the bag making machine. A continuous length of interlocked zipper strips is paid off a spool and fed between the advancing film webs. Typically the webs and the zipper are advanced intermittently, while certain operations are performed during the dwell times. At a first sealing station, marginal portions of opposing sections of each web are sealed to the backs of opposing section of the respective zipper strips by a first pair of horizontal heated sealing bars. At the same time, marginal portions of opposing sections of each web are heat sealed together to form a bottom seal. At an ultrasonic welding station, the zipper is stomped as shown in FIG. 5. At a second sealing station, the cross seals are formed by conduction heat sealing as shown in FIG. 6. At a cutting station, the individual bags are severed from one another by cutting along a line that bisects the cross seal, thereby forming respective side seals on the separated bags. A person skilled in the art will appreciate that the bag could be formed from a single web that is folded and cross sealed, instead of from two webs that are bottom sealed and then cross sealed together. Also the zipper strips could be joined to the respective webs separately and then interlocked before ultrasonic welding of the zipper joints.

Figure 8:
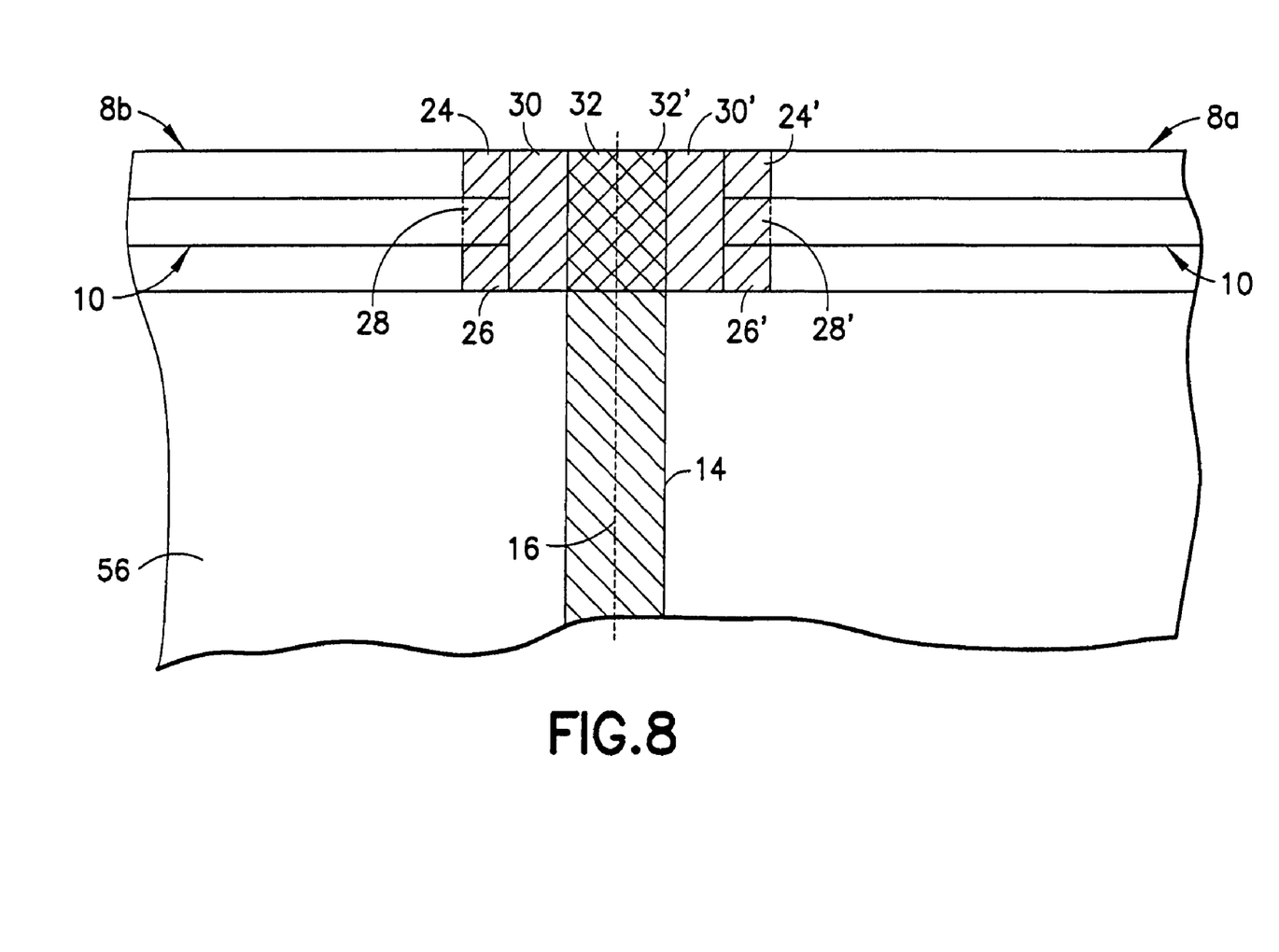
FIG. 8 is a drawing showing steps of a method of manufacture in accordance with another embodiment of the invention.

In accordance with another embodiment of the invention, the technique of ultrasonically welding the ends of the zipper strips together without substantial deformation could be used in conjunction with segmented zipper to make packages or bags. In this application, equal-length zipper segments are joined to both webs of bag making film. The zipper segments are disposed in a line with respective gaps separating successive zipper segments. This arrangement allows for no zipper in the cross seal 14, as shown in FIG. 8. The zone of ultrasonic welding is denoted in FIG. 8 by the hatching lines that rise from left to right, while the zone of thermal crushing is denoted by the hatching lines that rise from right to left. These two zones overlap in the areas 32 and 32', which are located in the gap between successive zipper segments 8*a* and 8*b*. Zones 30 and 30' in FIG. 8 represent areas where the film webs are ultrasonically welded together (with no conduction heat sealing); zones 24 and 24' represent areas where the zipper upper flanges are ultrasonically welded together and the film webs are ultrasonically welded to the upper flanges; zones 26 and 26' represent areas where the zipper lower flanges are ultrasonically welded together and the film webs are ultrasonically welded to the lower flanges; and zones 28 and 28' represent areas where the central portions 10 of the zipper strips are ultrasonically welded together without substantial deformation and the film webs are ultrasonically welded to the backs of the central portions. To accomplish the desired ultrasonic welding in zones 24, 26, 28, 30, 32 and zones 24', 26', 28', 30', 32' without substantial deformation in zones 28 and 28', a horn can be used that has a flat surface except for recesses corresponding to zones 28 and 28'.

While the invention has been described with reference to various embodiments, it will be understood by those skilled in the art that various changes may be made and equivalents may be substituted for elements thereof without departing from the scope of the invention. In addition, many modifications may be made to adapt a particular situation to the teachings of the invention without departing from the essential scope thereof. Therefore it is intended that the invention not be limited to the particular embodiment disclosed as the best mode contemplated for carrying out this invention, but that the invention will include all embodiments falling within the scope of the appended claims.

As used in the claims, the verb "joined" means fused, welded, bonded, sealed, adhered, etc., whether by application of heat and/or pressure, application of ultrasonic energy, application of a layer of adhesive material or bonding agent, interposition of an adhesive or bonding strip, co-extrusion (e.g., of zipper and bag), etc. In addition, each recitation of a "width" is a respective dimension measured along the same axis. For example, the width of an ultrasonically welded area and the width of a thermally crushed area are both measured along a lengthwise direction of the zipper. As used in the claims, the term "relatively little deformation" means an amount of deformation that is substantially less than the relatively large deformation that occurs when two profiled closure elements are crushed or flattened.

The invention claimed is:

1. A method of forming a zipper joint joining first and second zipper strips made of thermoplastic material, wherein said first zipper strip comprises a first base and a first longitudinal closure element projecting from said first base, and said second zipper strip comprises a second base and second and third longitudinal closure elements projecting from said second base, said first longitudinal closure element being profiled to project between and interlock with the profiles of said second and third longitudinal closure elements, said method comprising the following steps:

(a) arranging said first and second zipper strips so that said first longitudinal closure element projects between and is interlocked with said second and third longitudinal closure elements;

(b) supplying sufficient ultrasonic wave energy into a first volume having a first width to cause the material of said interlocked first and second zipper strips in said volume of first width to fuse together to form a leakproof zipper joint, including at least said first longitudinal closure element being fused to said second and third longitudinal closure elements in said first volume; and (c) applying an amount of pressure in said first volume during step (b), the amount of pressure applied causing relatively little deformation of said first through third longitudinal closure elements.

2. The method as recited in claim 1, wherein said first base is fused to said second base during step (b).

3. The method as recited in claim 1, wherein said first zipper strip further comprises a fourth longitudinal closure element projecting from said first base, and said second zipper strip further comprises a fifth longitudinal closure element projecting from said second base, said fourth longitudinal closure element being profiled to project between and interlock with the profiles of said third and fifth longitudinal closure elements, and said third longitudinal closure element being profiled to project between and interlock with the profiles of said first and fourth longitudinal closure elements, and step (a) further comprises arranging said first and second zipper strips so that said fourth longitudinal closure element projects between and interlocks with said third and fifth longitudinal closure elements, and said third longitudinal closure element projects between and interlocks with the profiles of said first and fourth longitudinal closure elements.

4. A method of manufacture comprising the following steps:

(a) joining a base of a first zipper strip to a corresponding band-shaped zone of a first panel made of web material, said first zipper strip comprising a first longitudinal closure element;

(b) joining a base of a second zipper strip to a corresponding band-shaped zone of a second panel made of web material, said second zipper strip comprising second and third longitudinal closure elements, said first longitudinal closure element being profiled to project between and interlock with the profiles of said second and third longitudinal closure elements;

(c) arranging said first and second zipper strips so that said first longitudinal closure element projects between and is interlocked with said second and third longitudinal closure elements;

(d) supplying sufficient ultrasonic wave energy into a first volume having a first width to cause the material of said interlocked first and second zipper strips in said first volume to fuse together to form a leakproof zipper joint, including at least said first longitudinal closure element being fused to said second and third longitudinal closure elements in said first volume; and (e) applying an amount of pressure in said first volume during step (d), the amount of pressure applied causing relatively little deformation of said first through third longitudinal closure elements.

5. The method as recited in claim 4, further comprising the following step: (f) applying sufficient heat and pressure in a second volume, having a second width and intersecting said first volume, to cause said fused first through third longitudinal closure elements to undergo substantial deformation in said second volume, wherein said second width is less than said first width, and said first volume extends to space on opposite sides of said second volume.

6. The method as recited in claim 5, wherein step (f) further comprises applying sufficient heat and pressure in a stripshaped zone that has said second width, is contiguous with said second volume, and extends transverse to and does not intersect said first volume, to cause opposing and contacting respective portions of said first and second panels to soften or become molten in said strip-shaped zone.

7. The method as recited in claim 6, further comprising the following step: (g) cutting said first and second panels and said first and second zipper strips along a cut line that generally divides said stripshaped zone and said second volume and is generally transverse to said first and second zipper strips.

8. The method as recited in claim 7, wherein steps (d) through (g) are repeated at regular spaced intervals, each cutting step causing a separate bag to be severed from said first and second panels with attached first and second zipper strips.

9. The method as recited in claim 5, wherein central portions of said first and second zipper strips are substantially flattened in step (f).

10. The method as recited in claim 4, wherein said flange of said first zipper strip is fused to said base of said second zipper strip during step (d).

11. The method as recited in claim 4, wherein said first zipper strip further comprises a fourth longitudinal closure element projecting from said first base, and said second zipper strip further comprises a fifth longitudinal closure element projecting from said second base, said fourth longitudinal closure element being profiled to project between and interlock with the profiles of said third and fifth longitudinal closure elements, and said third longitudinal closure element being profiled to project between and interlock with the profiles of said first and fourth longitudinal closure elements, and step (c) further comprises arranging said first and second zipper strips so that said fourth longitudinal closure element projects between and interlocks with said third and fifth longitudinal closure elements, and said third longitudinal closure element projects between and interlocks with the profiles of said first and fourth longitudinal closure elements.

12. A method of manufacture comprising the following steps:

(a) joining a base of a first zipper strip to a corresponding band-shaped zone of a first panel made of web material, said first zipper strip comprising a first longitudinal closure element;

(b) joining a base of a second zipper strip to a corresponding band-shaped zone of a second panel made of web material, said second zipper strip comprising second and third longitudinal closure elements, said first longitudinal closure element of said first zipper strip being profiled to project between and interlock with the profiles of said second and third longitudinal closure elements of said second zipper strip;

(c) arranging said first and second zipper strips so that said first longitudinal closure element of said first zipper strip projects between and is interlocked with said second and third longitudinal closure elements of said second zipper strip;

(d) joining a base of a third zipper strip to a corresponding band-shaped zone of said first panel, said third zipper strip comprising a first longitudinal closure element having the same profile as said first longitudinal closure element of said first zipper strip, and said first and third zipper strips being collinear and separated by a gap having a first width;

(e) joining a base of a fourth zipper strip to a corresponding band-shaped zone of said second panel, said fourth zipper strip comprising second and third longitudinal closure elements respectively having the same profiles as said second and third longitudinal closure elements of said second zipper strip, and said second and fourth zipper strips being collinear and separated by said gap of first width;

(f) arranging said third and fourth zipper strips so that said first longitudinal closure element of said third zipper strip projects between and is interlocked with said second and third longitudinal closure elements of said fourth zipper strip;

(g) supplying sufficient ultrasonic wave energy to cause the material of said interlocked first and second zipper strips in a first volume adjacent one end of said gap to fuse together to form a first leakproof zipper joint and to cause the material of said interlocked third and fourth zipper strips in a second volume adjacent the other end of said gap to fuse together to form a second leakproof zipper joint, including at least said respective first longitudinal closure elements being fused to said respective second and third longitudinal closure elements in each of said first and second volumes; and (h) applying an amount of pressure in each of said first and second volumes during step (g), the amount of pressure applied causing relatively little deformation of said first through third longitudinal closure elements.

13. The method as recited in claim 12, further comprising the following step: (i) applying sufficient heat and pressure in a stripshaped zone having a second width and extending through said gap, said second width being less than said first width, to cause contacting portions of said first and second panels to soften or become molten in said strip-shaped zone, wherein said strip-shaped zone does not intersect any of said first through fourth longitudinal closure elements and extends from a top to a bottom of said first and second panels.

14. The method as recited in claim 13, further comprising the following step: (j) cutting said first and second panels along a cut line that generally divides said strip-shaped zone and is generally transverse to said first and second zipper strips.

15. The method as recited in claim 14, wherein steps (d) through (g) are repeated at regular spaced intervals, each cutting step causing a separate bag to be severed from said first and second panels with attached first and second zipper strips.

16. The method as recited in claim 12, wherein said flange of said first zipper strip is fused to said base of said second zipper strip during step (g).

17. The method as recited in claim 12, wherein said first zipper strip further comprises a fourth longitudinal closure element projecting from said first base, and said second zipper strip further comprises a fifth longitudinal closure element projecting from said second base, said fourth longitudinal closure element being profiled to project between and interlock with the profiles of said third and fifth longitudinal closure elements, and said third longitudinal closure element being profiled to project between and interlock with the profiles of said first and fourth longitudinal closure elements, and step (c) further comprises arranging said first and second zipper strips so that said fourth longitudinal closure element projects between and interlocks with said third and fifth longitudinal closure elements, and said third longitudinal closure element projects between and interlocks with the profiles of said first and fourth longitudinal closure elements.

* * * * *